Jan. 10, 1956  H. H. GORRIE  2,730,379
FLUID PRESSURE COUPLE
Filed Dec. 20, 1951  3 Sheets-Sheet 1

INVENTOR.
HARVARD H. GORRIE
BY
Raymond W. Jenkins
ATTORNEY

Jan. 10, 1956

H. H. GORRIE 2,730,379

FLUID PRESSURE COUPLE

Filed Dec. 20, 1951

INVENTOR.
HARVARD H. GORRIE
BY
Raymond W. Jumblin
ATTORNEY

United States Patent Office 2,730,379
Patented Jan. 10, 1956

2,730,379

FLUID PRESSURE COUPLE

Harvard H. Gorrie, Cleveland Heights, Ohio, assignor to Bailey Meter Company, a corporation of Delaware Application December 20, 1951, Serial No. 262,613

1 Claim. (Cl. 284—1)

My invention relates to control systems operable either automatically or remotely manually to maintain any desired electrical, thermal, chemical, physical or other variable condition through the control of a corrective agent or agents, or to remotely position a movable element. More particularly, my invention relates to control systems wherein a fluid pressure is utilized as the motive force for actuating devices to control the rate of application of corrective agents.

It is frequently necessary that a system be provided for regulating the supply of an agent affecting a condition, and the system should be operable either automatically in response to the condition for maintaining it at a desired constant value or remotely manually for varying the condition as desired. The supply of the agent may be controlled by a device which is operated by fluid delivered at the pressure regulated by the system. When the system is switched from automatic to hand control, or vice versa, the pressure supplied to the control device, immediately after the switch-over, should be the same as the pressure supplied before the switch-over was made, otherwise an operation of the device may occur to vary the agent and upset the system. It is therefore desirable that means be provided for regulating and indicating the pressures in order that the switch-over operation may be carried out effectively.

While I have chosen to illustrate and describe my invention in connection with a pneumatic fluid pressure control system and apparatus, it will be understood that the system and apparatus is equally adaptable to other fluids useful in control systems and in other general types of measuring and/or control systems besides the one which I specifically illustrate and describe.

In such a pneumatically actuated fluid pressure control or measuring system it is common to provide what may be termed a "Selector Station" providing, at one or more locations, the possibility of controlling a movable device, or devices, either from the automatic measuring-controlling instrument or selectively by remote manual means. A particular feature of my present invention lies in the structure of a preferred selector station apparatus.

A principal object is to provide, in connection with an improved selector station for selectively effecting either manual or automatic control, provision whereby the selector station may be in effect de-clutched or un-plugged from the rest of the system as well as from its mounting panel to thereby allow its removal as a whole for adjustment, overhauling or repair.

Specifically, my improved removable selector station system and apparatus allows the removal of the selector station per se from the system without loss of air pressure in the various lines connecting to the selector station prior to its removal, through the agency of self-closing valves.

In the drawings:

Fig. 1 diagrammatically illustrates a selector station in a simple fluid pressure control system.

Figure 1:
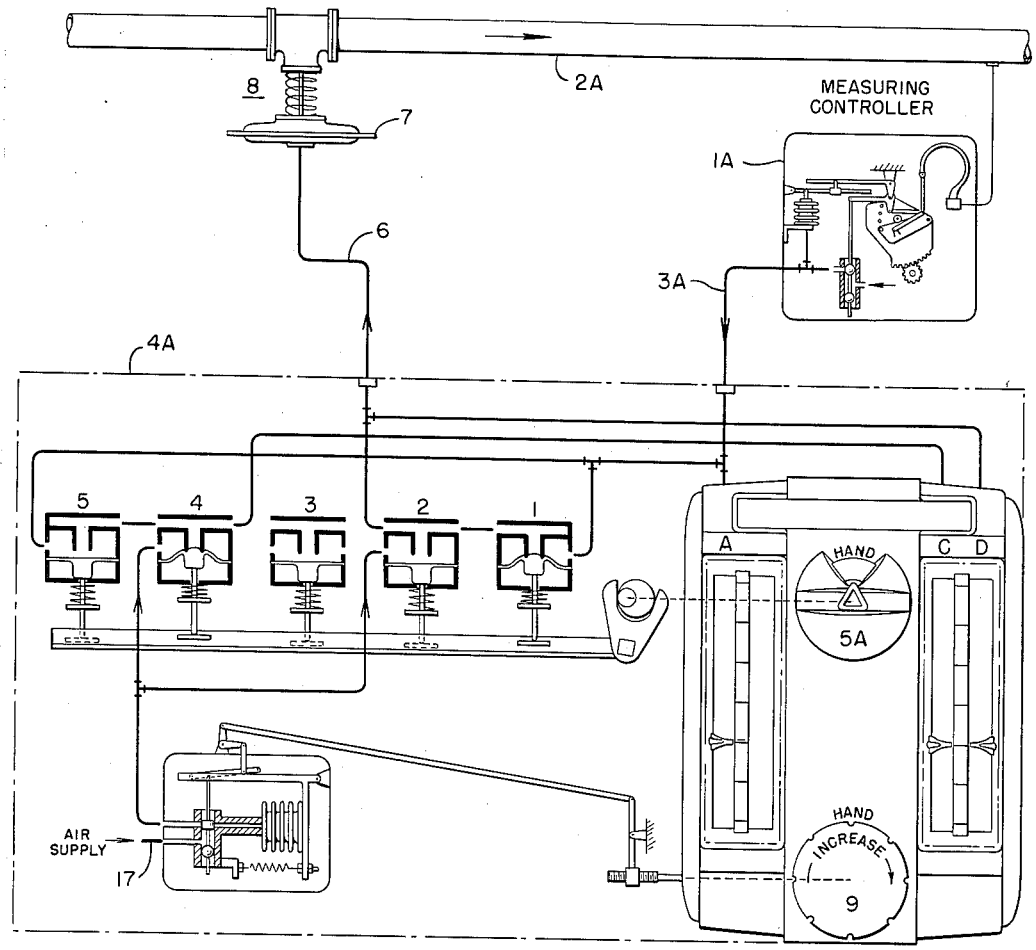

Referring now to Fig. 1 I show therein quite diagrammatically a simple fluid flow control system in which a measuring controller 1A is sensitive to the instantaneous value of pressure within a conduit 2A for continuously establishing in a pipe 3A a pneumatic control pressure within a range (for example 0–30 p. s. i.) proportionately representative of some desired range of values of the variable. Such a range may be a range from 0 to maximum expected value or a suppressed range within the confines of such extremes.

At a local or remote point I provide a manual-automatic selector station 4A to which the pipe 3A is connected. The indicator pointer of instrument A makes the value of the measurement continuously visible by movement relative to the graduation and the scale may be graduated in terms of the measurement. In general the device 4A provides selective possibilities and when the selective knob 5A is in "automatic" position, then the control pressure in pipe 3A is passed through the device 4A to a pipe 6 for impression upon the diaphragm 7 of a valve 8 adapted to control the rate of flow of fluid through the conduit 2A.

When it is desired to place the control of valve 8 under "hand" domination from the location 4A it is possible to turn the knob 5A to its "hand" position and thereafter to control the pressure in the pipe 6 by means of hand control knob 9.

Actuation of the selector knob 5A manually between the "hand" and "automatic" positions thereof effectively opens or closes fluid pressure valves and the said valves, along with the mechanism for positioning them, are described and claimed in the copending application of Paul S. Dickey et al. S. N. 251,406 filed October 15, 1951, to which reference may be had. Suffice it to say here that under the "hand" position of selective knob 5A the valves 1 and 4 are closed while valves 2, 3 and 5 are open. Under the "automatic" position of selective knob 5A the valves 1 and 4 are open and valves 2, 3 and 5 are closed.

The selector station 4A may be constructed with other combinations of air pressure shut-off valves and in other piping arrangements between measuring controller and controlled devices. There is normally an air supply pipe 17 joining the selector station and there may be two or more other pipes (such as 3A and 6) joining the selector station 4A with other pieces of apparatus. It will be apparent that if inspection, overhauling, repair or the like is to be done upon the selector station 4A it would be much simpler and preferable to remove the entire structure from its mounting and take it to a work bench or more convenient place. Such removal however predicates the disconnecting of the various pressure pipes which join the selector station and the reconnecting of them after the selector station has been remounted on its panel or other location. One of the particular difficulties in thus disconnecting the various pipes is that they then become open to the atmosphere unless they are individually provided with shut-off valves and all of the shut-off valves are carefully closed before removal of the station.

With pipe 6 opened to the atmosphere it would immediately cause valve 8 to go to one extreme or the other of its travel, which would be undesirable. Opening the air supply pipe 17 to the atmosphere would, of course, cause a maximum continuous drain upon the air compressor system at that point. The loss of fluid pressure from the pipe 3A to the atmosphere would cause a power loss in supplying such air. It is ready apparent that it is not desirable, in fact, it may be dangerous in controlled systems, to disconnect the various pipes joining the selector station and allow them to open to the atmosphere. Furthermore, it is expensive to provide all of the joining pipes with shut-off valves and it is inconvenient to see that they are all shut properly and later all opened properly. A particular feature of my present invention is in the provision of means in connection with the selector station 4A whereby the latter may be unplugged from its connecting pipe lines, for removal of the selector station, and with immediate automatic closing off of the ends of the pipes from which the selector station has been unplugged or uncoupled.

Figure 2:
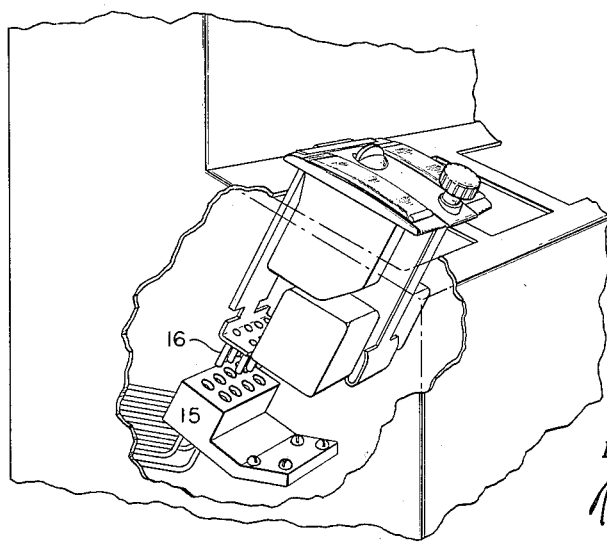
Fig. 2 is a perspective drawing of a portion of a panel board illustrating how a selector station may be un-plugged for removal.
Figure 3:
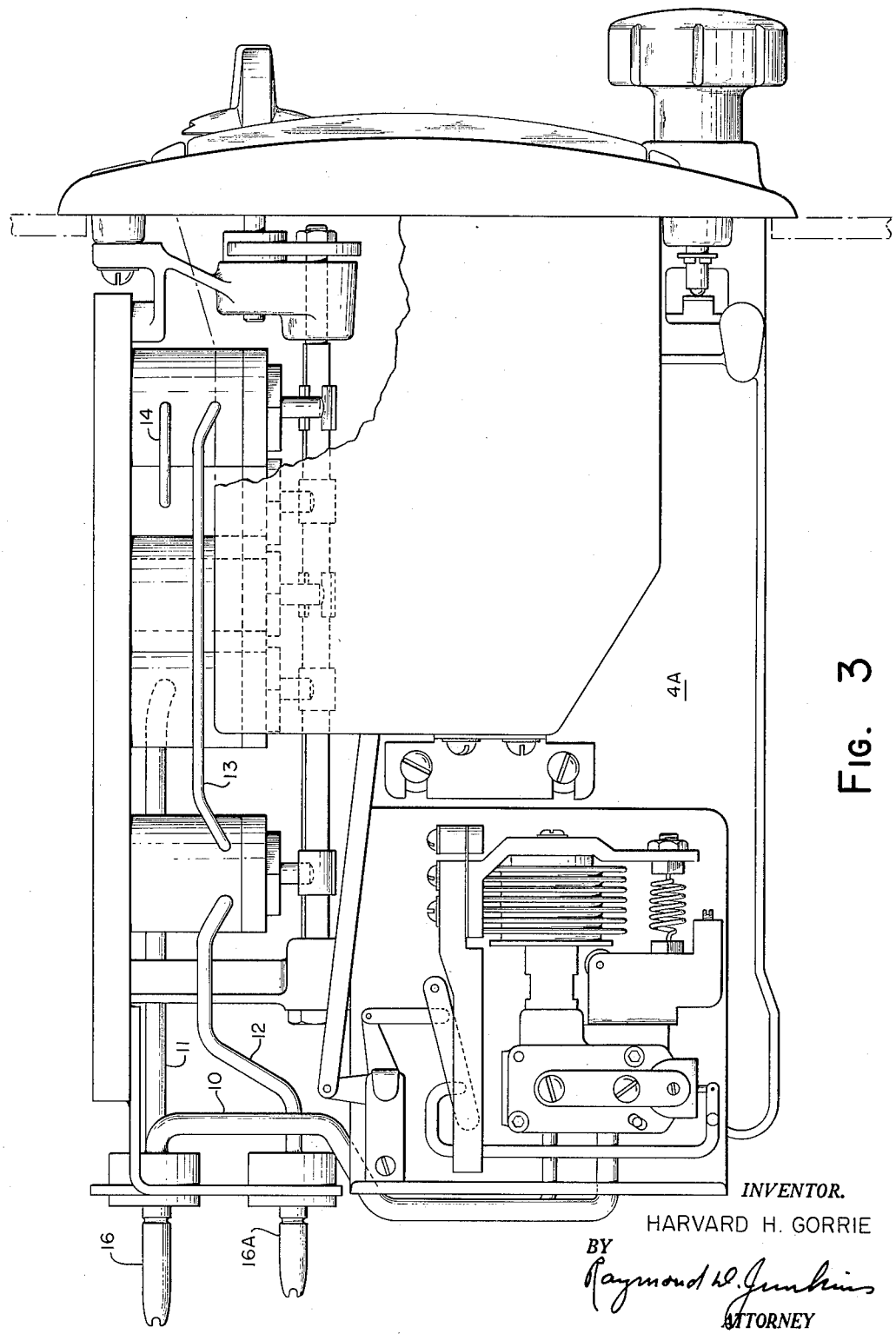
Fig. 3 is a side elevation, partially in section, of the selector station of Figs. 1 and 2, to somewhat larger scale.

In Fig. 3 I show a side elevation of the selector station 4A and, rather schematically, I show pipes such as 10, 11, 12, 13 and 14 joining the various selector shut-off valves and other portions of the selector station. Those pipes such as 3A and 6 as well as "air supply" and any others which join the selector station to the external piping system are led to a permanently mounted piping manifold structure 15 (Fig. 2) connecting such pipes in a bank. The manifold 15 is provided with the necessary female openings for receiving plugs such as 16 which are the hollow ends of pipe connections within the selector station assembly. It can be seen, from Figs. 2 and 3, that the selector station 4A may be removably unplugged from the permanently located manifold 15. The particular construction and features of the combination including manifold 15 and the plugs 16 will now be described in connection with Figs. 4, 5, 6 and 7.

While the arrangement is adaptable to various combinations of plugs and receptacles, I have shown in these figures two pairs; the pipe 17 representative of air supply (Fig. 1) and the pipe 6 previously mentioned.

Figure 4:
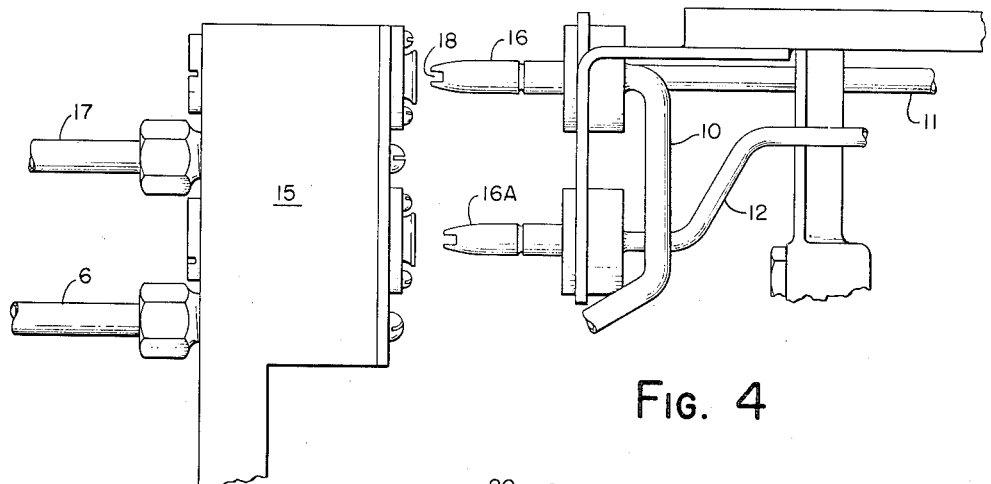
Figs. 4, 5 and 6 are progressive showings of the plugging or reconnecting operation.

Referring first to Fig. 4, plug 16 is shown longer than plug 16A and will enter manifold 15 first when the selector station assembly (to the right in Fig. 4) is moved toward the fixed manifold 15 (to the left in Fig. 4).

The plugs, of which 16 is representative, are hollow tubes having a somewhat coned or pointed end with one or more cross slots 18 allowing access to the bore of the plug when the tip of the plug is seated against a surface.

Figure 5:
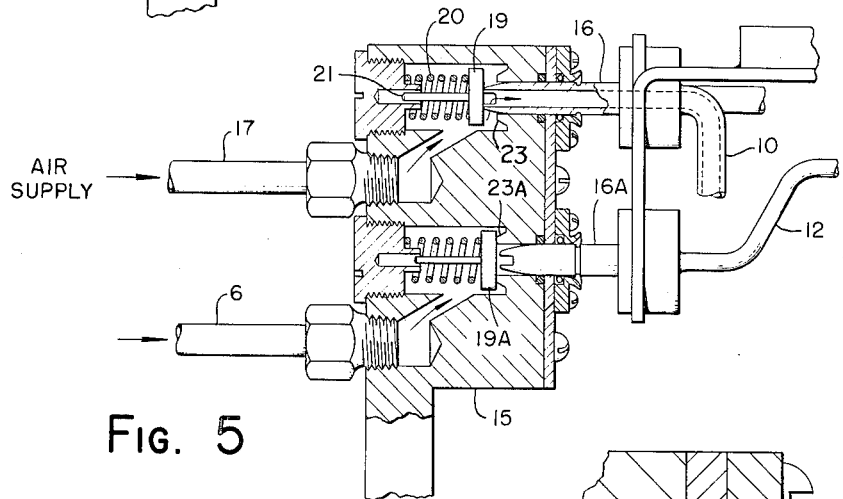
Figure 7:
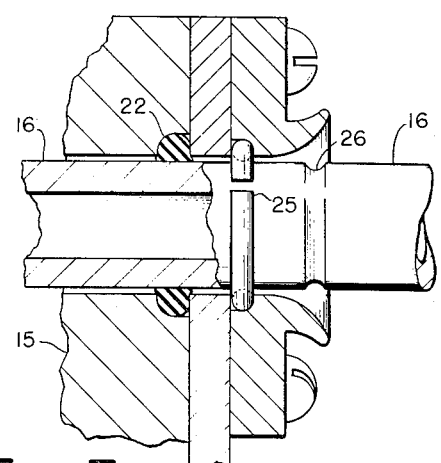
Fig. 7 is an enlarged detail of a portion of Figs. 4, 5 and 6.

Fig. 5 indicates the initial entry of plugs 16, 16A into the corresponding outlet openings of manifold 15 and wherein plug 16 has contacted the movable valve member 19 in the valve chamber, forcing the latter against the action of a spring 20 as guided by the pin projection 21 off the seat 23. Air supply pressure in the pipe 17 is now available within the tube bore of plug 16 and is sealed against leakage to the atmosphere by O-ring 22 (Fig. 7). In the position depicted in Fig. 5 the plug 16A has not entered far enough to contact the valve 19A and unseat it from the seat 23A. There is therefore, in Fig. 5, no pressure connection between pipe 6 and pipe 12, connection being blocked by the valve 19A seating on the seat 23A.

Figure 6:
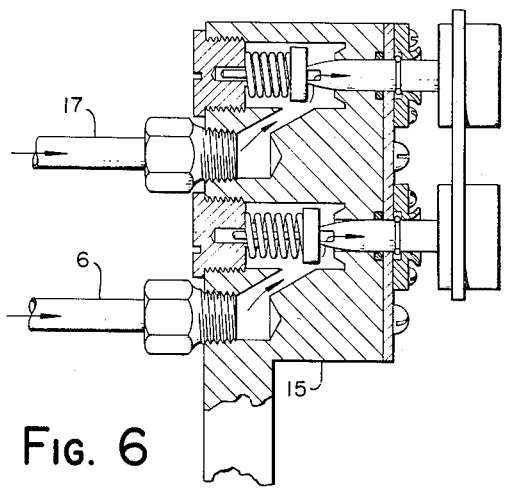

As the selector station 4A with its bank assembly structure for conduit terminations is moved further toward the left, plugs 16, 16A are urged further into the manifold assembly 15, compressing spring 20, and plug 16A unseats valve 19A from its seat 23A allowing communication between the pipes 6 and 12. The continued movement of the selector station toward the manifold 15 results in a final position of rest as shown in Fig. 6, where the split ring spring 25 (Fig. 7) falls into the annular recess 26 on each of the plugs. These light but positive locking engagements are sufficient to prevent the action of springs 20 from tending to force the plugs 16, 16A and the entire assembly of the selector station away from the manifold 15.

The final position of rest is depicted in Fig. 6 in which pipe 17 communicates with the interior of plug 16 and pipe 6 communicates through the interior of plug 16A with the pipe 12.

In Fig. 7 I have shown to somewhat enlarged scale a portion of the assembly, for instance from Fig. 5, to show that as plug 16 enters the bore of manifold 15 the exterior of the plug frictionally engages the O-ring 22 thus pressure sealing around the plug from the atmosphere. Continued motion, toward the left, causes the groove 26 of the plug 16 to register with the spring wire 25 which falls into the recess 26. The resistance offered by the spring 25 and recess 26, to axial movement of the plug 16, is enough to prevent vibration or similar tendency of the parts to become separated. The resistance is not sufficient, however, to seriously impede separation of the parts manually when it is desired to remove the selector station from the permanently mounted manifold.

Preferably, in the present system, I indicate that a fluid opening connection is formed between the air supply pipe 17 and its mating receiving pipe 16, within the selector assembly prior to the mating of any of the other plugs and sockets. When the selector station is removed from manifold 15 the air supply passage is the last to be closed, and, when the selector station is reinserted in the manifold, the air supply is the first to be opened. Thus air supply pressure is available to the various portions of the selector station both before and after any of the other connecting pipes are separated or reconnected, which is important.

If it is desired to remove a selector station 4A from the panel board for repair, a spare selector station may be adjusted to the same valve and knob setting to be inserted into the manifold 15 upon removal of the station to be repaired. By applying air supply pressure to the new selector valve prior to that of the other piping connections, the various pressures will be substantially the same as those which were extant when the previous selector station was removed, and, thus preclude erratic change or bump in the controlled mechanisms by such exchange of selector stations.

The arrangement provides for an immediate shutting off of all connecting pipes such as 3A, 6 and 17 immediately after the selector station is removed from service and eliminates air leakage around the plugs 16 during the process or removal or reinsertion, or while in joined relation with the manifold 15. The action is completely automatic inasmuch as the pipes are closed off by the seating of valves 19 and 19A upon withdrawal of the plugs 16, 16A and no hand valves need be turned off or turned on.

While I have chosen to describe my invention in connection with a selector station in a pneumatic pressure system, it will be understood that any fluid pressure device may be uncoupled from a fluid pressure pipe as described, and that the fluid need not be air but may be gases or liquids.

What I claim as new, and desire to secure by Letters Patent of the United States, is:

Fluid pressure coupling structure adapted to connect a control station between a source of fluid pressure and a controlled system, including; a stationary bank housing including, a plurality of chambers adapted to be connected to the fluid pressure supply and controlled system, a plurality of female receptacle passages of substantial length opening externally of the housing, a valve seat surface formed on the chamber end of each passage, with each of said valve seat surfaces being substantially equidistant from the respective external end of the receptacle passages, an O-ring positioned in an annular recess in each passage adjacent the external end of the passage, a valve in each chamber spring-urged onto the seat at the chamber end of each passage, and an annular locking ring mounted in each passage; and an assembly of male plugs held on a common mounting and including, a first tubular plug longer than the other plugs to register with the female receptacle adapted to be valved to the fluid pressure supply and seal with the O-ring prior to actuating the valve by abutting thereon, the other tubular plugs being shorter than the first plug and which register with their female receptacles adapted to be valved to the controlled system and sealing with their O-rings prior to actuating their valves by abutting thereon, and an annular locking recess formed about each plug releasably engaging the ring mounted in each passage.

References Cited in the file of this patent

UNITED STATES PATENTS

| | | |
|---|---|---|
| 739,793 | Shourek | Sept. 22, 1903 |
| 889,952 | McGinley et al. | June 9, 1908 |
| 1,486,279 | Burchell | Mar. 11, 1924 |
| 2,086,569 | Meyer | July 13, 1937 |
| 2,202,286 | Gorrie | May 28, 1940 |
| 2,471,237 | Pasturczak | May 24, 1949 |
| 2,548,528 | Hansen | Apr. 10, 1951 |
| 2,588,799 | Booth | Mar. 11, 1952 |
| 2,618,978 | Ragland | Nov. 25, 1952 |
| 2,651,317 | Heinz | Sept. 8, 1953 |

FOREIGN PATENTS

| | | |
|---|---|---|
| 103,116 | Germany | May 12, 1899 |
| 348,849 | Italy | June 1, 1937 |